United States Patent [19]
Knipe

[11] 3,750,862
[45] Aug. 7, 1973

[54] FEED DOG LINK ASSEMBLY FOR SPROCKET CHAIN

[75] Inventor: Leonard E. Knipe, Longview, Tex.

[73] Assignee: Continental Can Company, Inc., New York, N.Y.

[22] Filed: Apr. 7, 1971

[21] Appl. No.: 132,034

[52] U.S. Cl................................ 198/189, 198/197
[51] Int. Cl.............................................. B65g 17/00
[58] Field of Search............................ 198/189, 168

[56] References Cited
UNITED STATES PATENTS 1,843,453   2/1932   Littlefield ........................ 198/168
1,913,001   6/1932   Ross................................. 198/168

Primary Examiner—Richard E. Aegerter
Attorney—Fred P. Kostka, Joseph E. Kewin and William A. Dittmann

[57] ABSTRACT

A feed dog link assembly for a sprocket chain including a feed dog member mounted for lengthwise movement of the link. The feed dog member is selectively positioned by eccentric means carried by the link.

5 Claims, 5 Drawing Figures

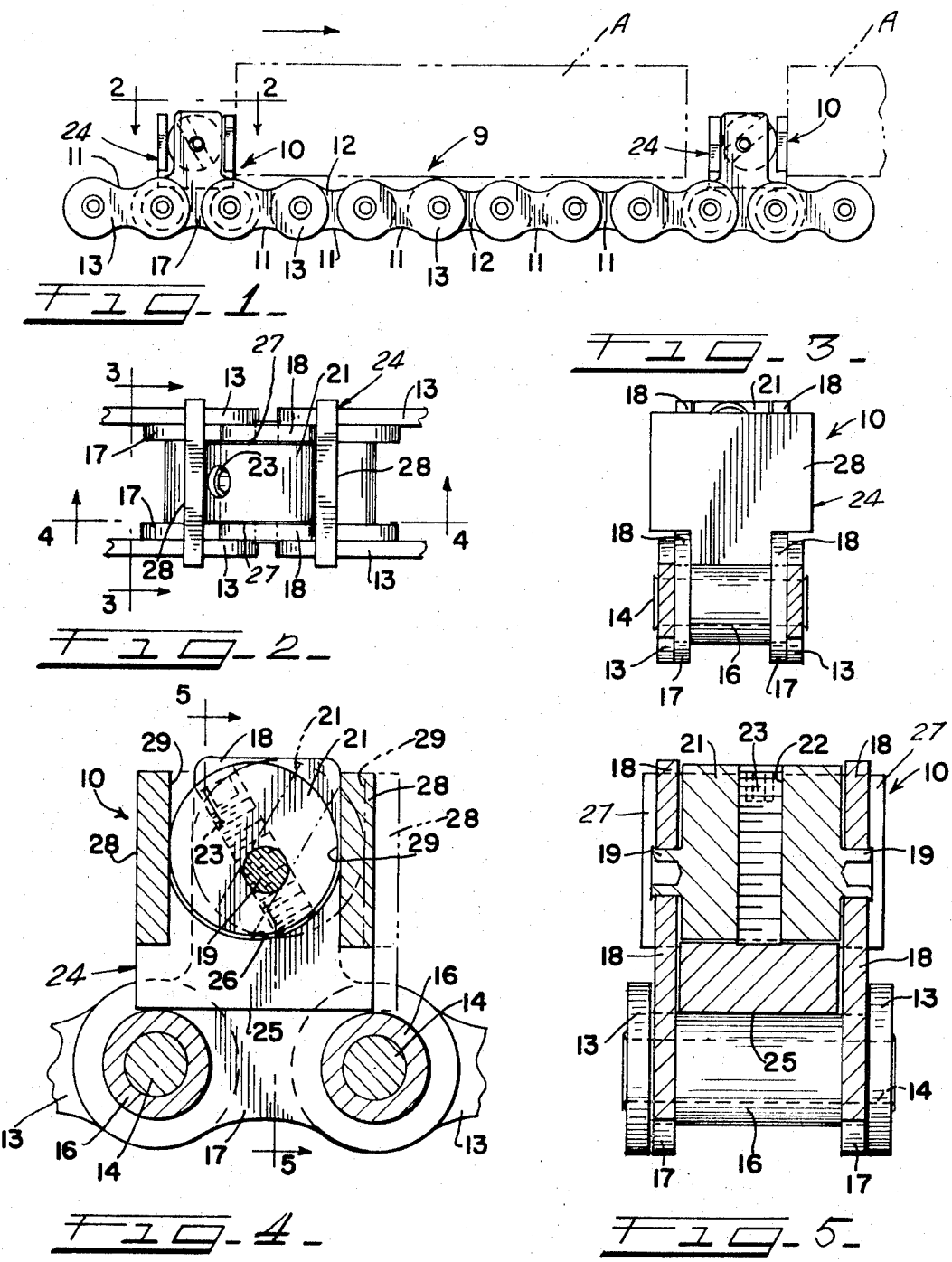
INVENTOR
LEONARD E. KNIPE
BY [signature]
ATT'Y

FEED DOG LINK ASSEMBLY FOR SPROCKET CHAIN

BACKGROUND OF THE INVENTION

The present invention relates to sprocket chains used as conveyor chains and more particularly to an improved feed dog means that is capable of permitting adjustment of the feeding faces without removal of the feed dog from the conveyor chain.

Sprocket chains are frequently employed in conveyor systems to convey articles from one location to another. Feed dogs may be used to engage an edge of the conveyed object to carry the object to the next station. Generally, a plurality of feed dogs are spaced lengthwise of the chain to sequentially deliver the articles to the delivery location.

It may be essential that the sequential delivery be accurately timed particularly if automatic equipment or the like for performing work on the article is located at the delivery station.

Heretofore, positioning of the feed dogs to achieve close timing at the delivery station has been difficult to achieve over prolonged operating periods of the conveyor chain. These difficulties have been caused primarily by chain wear and stretching.

SUMMARY OF THE INVENTION

By the present invention, it is proposed to provide a new and novel feed dog arrangement for compensating for the wear and stretching so that close timing or lengthwise spacing can be maintained.

This is accomplished by incorporating into a conveyor sprocket chain a feed dog link assembly which includes a feed dog member and means for selectively positioning the feed dog member lengthwise of the chain. The eccentric adjustment selectively varies the distance between the lengthwise spaced feed dog members and thereby maintains close timing at the delivery station.

More specifically, the feed dog link assembly comprises a feed dog link including a pair of link plates having upstanding support arms. The feed dog link is connected to the adjacent links of the sprocket chain. A feed dog member having a pair of lengthwise spaced and transversely extending faces is mounted for lengthwise movement between the support arms. Adjustable eccentric means engaging the feed dog member serves to selectively position the feed dog means so that the leading face is selectively positioned lengthwise on the link. In this manner, the lengthwise spacing of adjacent dogs may be selectively positioned to the extent of the limits of eccentricity of the eccentric means so that the spacing between the feed faces of adjacent feed dogs may be maintained. The ability to adjust the spacing also makes it possible to maintain the delivery of the items being fed within close time tolerances.

BRIEF DESCRIPTION OF THE DRAWINGS

FIG. 1 is a front elevational view of a length of sprocket chain having a pair of lengthwise spaced feed dog link assemblies embodying the structure of the present invention;

FIG. 2 is a fragmentary top plan view of the sprocket chain taken generally along the lines 2—2 of FIG. 1 showing the feed dog link assembly;

FIG. 3 is a cross sectional view taken generally along the lines 3—3 of FIG. 2;

FIG. 4 is an enlarged cross sectional view taken generally along the lines 4—4 of FIG. 2; and FIG. 5 is a cross sectional view taken generally along the lines 5—5 of FIG. 4.

DESCRIPTION OF THE PREFERRED EMBODIMENTS

Referring now to the drawings in particular FIG. 1 there is shown a length of sprocket chain 9 having feed dog link assemblies 10 embodying the structure of the present invention. The feed dog link assemblies 10 are spaced lengthwise on the chain 9 and adapted to sequentially feed articles A in the direction of the arrow by pushing the trailing edge of the latter for delivery to a delivery station (not shown).

The sprocket chain 9 comprises a plurality of interconnected chain links 11 of more or less standard construction. Each alternate chain link 11 includes spaced inner link plates 12—12 which are connected to outer link plates 13—13 of adjacent sprockets. The link plates 12—12 and 13—13 adjacent chain links 11 are pivotally connected by pins 14 which may be peened at the outer ends thereof to maintain the chain assembled. Spacer sleeves or bushings 16 disposed on the pins 14 between opposing inner link plates 13—13 thereby maintaining the link plates 12—12 and 13—13 in a predetermined transversely spaced relationship to receive the sprocket teeth of sprocket gears in the well known manner.

Spaced lengthwise on the chain links 11 are the feed dog links 10. The lengthwise spacing is determined by the length of the article to be conveyed and/or by the timing sequence desired at the delivery station.

As shown, the feed dog link assemblies 10 each include side or link plates 17 which are pivotally connected at each end to link plates 12—12 of adjacent chain links 11 by means of the pins 14 and spacer sleeves 16. The feed dog side plates 17 include supporting means or upwardly projecting arms 18 in which the ends of shafts 19 of an eccentric 21 are journaled. Extending diametrically through a threaded opening 22 in the eccentric 21 is a set screw 23 which fixes a feed dog member 24 against lengthwise movement as more fully to be explained hereinafter.

The feed dog member 24 is in the form of a rectangular block having a base 25 which is supported on the sleeve 16 extending between the side plates 17. A U-shaped slot 26 in the block accommodates the eccentric 21. The sides of the feed dog member are formed with vertical slots 27 which loosely receive the supporting arms 18 projecting from the side plates 17. Feeding faces 28 are formed on the ends of the feed dog member 24 by means of grinding or the like to provide a smooth and true face for engaging the article A to be conveyed along the conveyor chain.

The lengthwise position of the feed dog feeding faces 28 is achieved by rotating the eccentric 21 by inserting an Allen wrench or the like into the socket of the set screw 23. Rotation of the eccentric 21, which is in engagement with opposing inner feed dog faces 29, causes the feed dog member 24 to be displaced into the direction of eccentricity. For example, as shown in phantom lines in FIG. 4 the eccentricity causes the feed dog member 24 to be displaced to the right. Rotation of the eccentric 21 in the opposite direction would displace the feed dog member 24 in the opposite direction or to the left.

When the desired position of the pushing face 28 is obtained, the set screw 23 extending through the eccentric 21 is tightened so as to bear against the bight portion of the U-slot 26 and thereby prevent further rotation of the eccentric 21.

In this manner, the feeding face 28 is held selectively positioned along the length of the conveyor sprocket chain 9. It should be readily apparent also that the spacing of the feed dog feeding faces 28 between adjacent ones of the feed dogs 10 may each be adjusted to position the faces 28 relative to each to achieve a desired timing of engagement or disengagement of the feed dogs with the article A.

What is claimed is:

1. A feed dog sprocket link for a sprocket chain comprising a link having a pair of link plates connected by lengthwise spaced means maintaining said link plates transversely spaced, a feed dog member supported on said lengthwise spaced means for lengthwise movement thereof, said feed dog member having spaced opposing surfaces, eccentric means disposed between and engaging said space opposing surfaces for selectively positioning said feed dog member lengthwise on said link, and means journaling said eccentric means on said link plates for rotation between said link plates, and means for angularly positioning said eccentric means to thereby selectively position said feed dog member lengthwise on said link.

2. The invention as defined in claim 1 wherein said link plates each include projecting support means, said feed dog member being disposed for lengthwise movement between said projecting support means, and said eccentric means is rotatably supported on said projecting supporting means.

3. The invention as defined in claim 2 wherein said spaced surfaces of said feed dog member define a U-shaped slot, and engagement with said spaced surfaces.

4. The invention as defined in claim 3 wherein a set screw extends through said eccentric means into clamping engagement with the surface of said feed dog member for clamping said feed dog member against lengthwise movement relative to said link.

5. A feed dog sprocket link for a sprocket chain comprising a link having a pair of link plates connected by lengthwise spaced means for maintaining said link plates transversely spaced, said link plates having projecting support means, a feed dog member supported on said lengthwise spaced means for lengthwise movement thereon, said feed dog having transversely extending feed faces and a U-shaped slot disposed between said feed faces, eccentric means (turnably supported) on said projecting support means and disposed in said U-shaped slot (for selectively) and engaging the opposed surfaces of said slot, means journaling said eccentric means on said projecting support means for rotation between said support means, means for angularly positioning said feed dog member on said lengthwise spaced means, and threaded means threaded into and extending through said eccentric means and engaging the surface defining said slot to hold said eccentric means against turning and thereby hold said feed dog member fixed in a selective angular position on said lengthwise spaced means.

* * * * *